Patented Aug. 29, 1933

1,924,445

UNITED STATES PATENT OFFICE 1,924,445

HALOGEN ANTHRAQUINONE BENZACRIDONE

Max Albert Kunz, Mannheim, and Karl Koeberle and Erich Berthold, Ludwigshafen - on - the - Rhine, Germany, assignors to General Aniline Works, Inc., New York, N. Y., a corporation of Delaware No Drawing. Application October 23, 1930, Serial No. 490,810, and in Germany October 28, 1929

5 Claims. (Cl. 260—37)

The present invention relates to new chloroanthraquinone-2.1(N)-benzacridones and process of producing and halogenating the same.

We have found that anthraquinone-2.1(N)-benzacridones (α-naphthoquinoneacridones) corresponding to the formula:

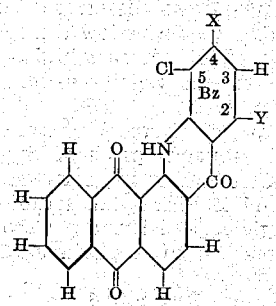

in which the positions marked X and Y may be substituted by chlorine, are particularly valuable vat dyestuffs dyeing from orange to blue red shades of remarkably good fastness against light and atmospheric influences. The said dyestuffs are obtained by condensing a 1-halogenanthraquinone-2-carboxylic acid or an ester or amide thereof with 2-chloroaniline or such derivatives thereof as are substituted in the 3- or in the 3- and 4-positions by chlorine, or by condensing 1-halogenanthraquinone with anthranilic acids substituted by chlorine in correspondence with the aforesaid chloroanilines, the resulting chlorophenyl-1-iminoanthraquinones having a carboxylic acid group in ortho position to the imino group being then converted into acridone derivatives.

The condensation may be carried out in the presence or absence of dissolving or diluting media and/or of acid-binding agents and preferably in the presence of condensing catalysts, as for example copper or its compounds. The ring-closure of the carboxylic acids or carboxylic acid derivatives to the corresponding acridones may sometimes be effected simultaneously with the condensation, as for example by the addition of a suitable condensing agent, such as oxalic acid, boric acid, phosphorus pentachloride or phosphorus pentoxide. The intermediately formed alpha-phenylaminocarboxylic acids may, however, also be isolated and converted into the corresponding acridone derivatives in any known and suitable manner, as for example by warming with phosphorus halides or thionyl chloride, preferably in an organic solvent or by treatment with acid condensing agents, as for example oleum, sulphuric acid or chlorosulphonic acid.

The Bz5-chloroanthraquinone-2.1(N)-benzacridone is particularly suitable for printing, whereas the Bz2.5-, the Bz4.5-dichloroanthraquinone-2.1(N)-benzacridones and the Bz2.4.5-trichloroanthraquinone-2.1(N)-benzacridone are more suitable for dyeing purposes.

As already mentioned the said chloroanthraquinone-2.1(N)-benzacridones dye orange to blue red shades of excellent fastness. The shades obtained with the said dyestuffs may be varied without impairing their good fastness properties by halogenating the said chloroanthraquinone-2.1(N)-benzacridones in organic solvents whereby when halogenating in the absence of halogenation catalysts the halogen enters the benzene nucleus and products are obtained dyeing from orange to red shades; when halogenating, however, in the presence of the said catalysts the halogen first enters the 4-position of the anthraquinone nucleus whereby the shades obtained with these latter dyestuffs are, generally speaking, more bluish, viz. from pink to blue red. Organic solvents which may be used in the halogenation process comprise in particular aromatic solvents of high boiling point, such as for example nitrobenzene, chlorobenzenes, homologues of the said derivatives of benzene, naphthalene and derivatives thereof. As halogenation catalysts those usually employed may be used, for example metals and metal compounds, such as iron, mercury, antimony and their halides, or non-metals, such as sulphur, selenium and in particular iodine.

The halogenanthraquinone-2.1-benzacridones are usually obtained in very good yields and in a pure state. They may, however, be purified and separated from isomers by known methods if necessary, as for example by crystallization from organic solvents, by sublimation, by treatment with oxidizing agents, for example by treating their aqueous pastes with alkali metal hypochlorites, or by way of their oxonium salts.

The following examples will further illustrate how this invention may be carried out in practice, but the invention is not restricted to these examples. The parts are by weight.

Example 1

57.2 parts of 1-chloroanthraquinone-2-carboxylic acid are heated to boiling while stirring in 500 parts of trichlorobenzene with 60 parts of 2.5 dichloroaniline and 25 parts of anhydrous oxalic acid until unchanged carboxylic acid can no longer be detected. The reaction mixture is then allowed to cool and the reaction product which mainly consists of 2',5'-dichlorophenyl-1-anthraquinone-2-carboxylic acid, separated out in crystalline form is filtered off.

70 parts of the reaction product are heated while stirring at between 160° and 170° C. in 250 parts of nitrobenzene with 40 parts of phosphorus pentachloride until a sample no longer dissolves in alkalies. The reaction mixture is then allowed to cool and worked up as usual. The Bz2.5-dichloroenthraquinone-2.1-benzacridone separated in the form of yellow red uniform needles dissolves in concentrated sulphuric acid to give an orange solution and dyes cotton clear yellow red shades of very good fastness from a violet vat.

Ring-closure to form the acridone derivative may also be effected by means of chlorosulphonic acid.

Example 2

38 parts of the benzyl ester of 1-chloroanthraquinone-2-carboxylic acid are heated at between 180° and 200° C. while stirring with 21 parts of 2.3.5-trichloroaniline, 13 parts of sodium acetate and 1 part of copper oxide in 100 parts of nitrobenzene until unchanged benzyl ester can no longer be detected. After cooling, the reaction product is filtered off and dissolved in the ten fold amount of concentrated sulphuric acid. After warming at 30° C. for one hour the reaction mixture is poured onto ice and the 1-(2'.3'.5'-trichlorophenylamino)-anthraquinone-2-carboxylic acid thus produced filtered off. The ring-closure to the acridone may be effected by known methods, for example by means of chlorosulphonic acid, phosphorus oxychloride or phosphorus pentachloride. The Bz2.4.5-trichloroanthraquinone-2.1-benzacridone thus obtained dissolves in concentrated sulphuric acid to give a yellow red solution and dyes cotton from a violet vat clear red orange shades of excellent fastness against light and atmospheric influences. It crystallizes from solvents of high boiling point, such as nitrobenzene or trichlorobenzene, in yellow red needles.

Example 3

40 parts of Bz4.5-dichloroanthraquinone-2.1-benzacridone (obtainable according to Example 5) are heated to boiling while stirring in 400 parts of trichlorobenzene and passing a current of chlorine through the reaction mixture until a sample furnishes decidedly more yellowish shades than the initial material. The reaction mixture is then allowed to cool and the Bz3.4.5-trichloroanthraquinone-2.1-benzacridone separated in red needles filtered off. It furnishes on the vegetable fibre yellow red shades of very good fastness against boiling with an alkaline solution from a violet vat.

Example 4

A suspension of 57.2 parts of 1-chloroanthraquinone-2-carboxylic acid, 25 parts of anhydrous boric acid and 32 parts of ortho-chloroaniline is heated to boiling, while stirring, in 500 parts of trichlorobenzene until a sample no longer dissolves in alkalies. The reaction mixture is then allowed to cool and the Bz5-chloroanthraquinone-2.1-benzacridone filtered off. It crystallizes in felt-like red needles, which dissolve in concentrated sulphuric acid to give an orange solution and which dye cotton from a violet vat very fast red shades.

The condensation may also be interrupted when the 1-chlorophenylaminoanthraquinone-2-carboxylic acid is formed, the acridone derivative being obtained therefrom in the usual manner, for instance by treatment with phosphorus pentachloride in nitrobenzene.

Example 5

286 parts of 1-chloroanthraquinone-2-carboxylic acid are heated to boiling for 7 hours, while stirring, in 2000 parts of trichlorobenzene with 180 parts of 2.3-dichloro-aniline and 125 parts of anhydrous oxalic acid. After cooling, the reaction product is filtered off and worked up in the usual manner.

100 parts of the 1-(2'-3'-dichlorophenyl)-aminoanthraquinone-2-carboxylic acid are suspended in 200 parts of nitrobenzene and heated to about 180° C. after the addition of 50 parts of phosphorus pentachloride. The Bz4-5-dichloroanthraquinone-2.1-benzacridone thus obtained is a red crystalline powder, dissolves in concentrated sulphuric acid to give a yellow red solution, dyes cotton from a violet vat fast bluish red shades and furnishes on the vegetable fibre excellently fast red printings.

Printing may be effected by means of a paste comprising an aqueous paste of the dyestuff, a thickening agent containing for example starch, tragacanth and British gum, sodium formaldehyde sulphoxylate, potash and glycerol, the printings being steamed at about 100° C. with wet steam.

Example 6

39 parts of the Bz2.5-dichloroanthraquinone-2.1-benzacridone, obtainable according to Example 1 are slowly heated, while stirring, to between 90° and 100° C. in 300 parts of nitrobenzene after the addition of 1 part of phosphorus, while passing chlorine into the reaction mixture which is kept at the said temperature for several hours and then heated for a short time to between 125° and 130° C. After cooling, the reaction product which separates in a crystalline form is filtered off. It is a tetra-chloroderivative according to analysis, dissolves in concentrated sulphuric acid to give an orange solution and dyes cotton very fast bluish red shades from a blue violet vat.

Example 7

36 parts of Bz5-chloroanthraquinone-2.1(N)-benzacridone are heated at between 160° and 180° C. for several hours in 360 parts of nitrobenzene after the addition of 40 parts of bromine and 1 part of iodine. The reaction mixture is allowed to cool and the 4-bromo-Bz3-bromo-Bz5-chloroanthraquinone-2.1(N)-benzacridone separated in the form of blue red needles filtered off. It dissolves in concentrated sulphuric acid to give an orange solution and furnishes on cotton, when dyed at between 20° and 30° C., red violet shades from a violet vat.

By chlorination by means of chlorine or sulphuryl chloride in trichlorobenzene the 4-

Bz3.5 - trichloroanthraquinone-2.1(N) - benzacridone is obtained.

What we claim is:—

1. Chloroanthraquinone-2.1(N) - benzacridones corresponding to the formula:

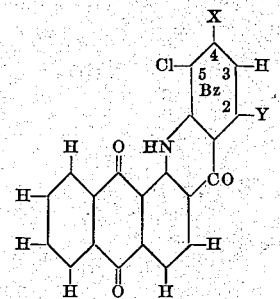

in which the positions marked X and Y may be substituted by chlorine, dyeing from orange to blue red shades from violet vats and dissolving in concentrated sulphuric acid to give orange solutions.

2. Bz5-chloroanthraquinone-2.1(N) - benzacridone crystallizing in red needles, dyeing cotton from a violet vat red shades and dissolving in concentrated sulphuric acid to give an orange solution.

3. Bz2.5-dichloroanthraquinone - 2.1(N) - benzacridone crystallizing in yellow red needles, dyeing cotton from a violet vat clear yellow red shades and dissolving in concentrated sulphuric acid to give an orange solution.

4. Bz4.5-dichloroanthraquinone - 2.1(N) - benzacridone crystallizing in yellow red needles, dyeing cotton from a violet vat clear yellow red shades and dissolving in concentrated sulphuric acid to give an orange solution.

5. Bz2.4.5-trichloroanthraquinone-2.1(N)-benzacridone crystallizing in yellow red needles, dissolving in concentrated sulphuric acid to give a yellow red solution and dyeing cotton from a violet vat clear red orange shades.

MAX ALBERT KUNZ.
KARL KOEBERLE.
ERICH BERTHOLD.